L. W. NICHOLLS.
Carriage Register.
No. 30,640.
Patented Nov. 13, 1860.
Fig. 1.
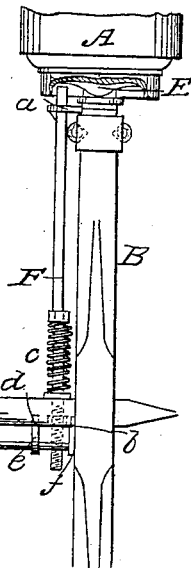
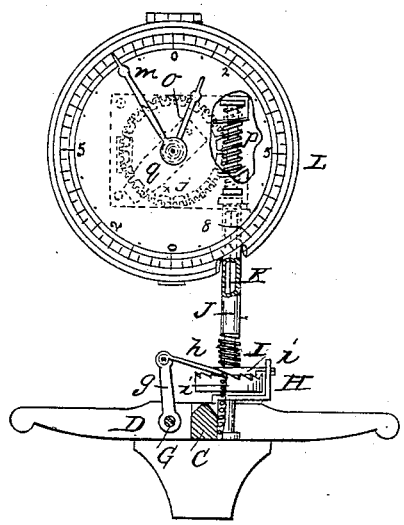
Fig. 2.
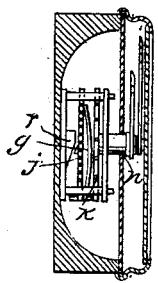
Fig. 3.
WITNESSES:
INVENTOR:

UNITED STATES PATENT OFFICE.

L. W. NICHOLLS, OF NORTH BROOKFIELD, NEW YORK.

ODOMETER.

Specification of Letters Patent No. 30,640, dated November 13, 1860.

*To all whom it may concern:*

Be it known that I, L. W. NICHOLLS, of North Brookfield, in the county of Madison and State of New York, have invented a new and Improved Carriage-Register; and I do hereby declare that the following is a full, clear, and exact description of the same, reference being had to the accompanying drawings, forming a part of this specification, in which—

Figure 1 represents a horizontal section of my invention. Fig. 2 is a transverse vertical section of the same. Fig. 3 is a detached sectional elevation of my registering device.

Similar letters of reference in the several figures indicate corresponding parts.

The object of this invention is to register by suitable indices or hands the number of revolutions made by one of the wheels of a carriage or other vehicle, so that if the exact circumference of the wheel be known, the distance over which the carriage has traveled can always be ascertained by means of a dial attached to the inside of carriage body; and my invention consists in the arrangement of a square tubular socket or sleeve in combination with the vertical arbor which serves to communicate motion to the registering wheels in such a manner that said arbor is allowed to rise and fall with the motions of the carriage, and that sudden jerks or other violent motions have no injurious influence on the correct action of the register.

To enable those skilled in the art to make and use my invention I will proceed to describe its construction and operation with reference to the drawings.

A represents the hub of one of the hind wheels of a carriage which runs on the axle B, and which connects by means of the perch C, with the forward axle D, in the usual manner. A cam E, is secured to the inside of the hub, and this cam gives motion to the transversely sliding rod F. This rod is guided in its motion by lugs or ears $a$, and its length can be adjusted to the correct point by a screw and nut $b$. A spiral spring $c$, wound around the rod F, forces its end against the surface of the cam, causing it (the rod) to follow all the undulations of said surface. The nut $b$, connects by means of an arm $d$, with a crank $e$, that is firmly secured to the rockshaft G, and this rockshaft extends in a longitudinal direction from the hind axle to the forward axle, having its bearings in lugs or ears $f$, attached to the inside of the axles. The length and position of the rockshaft may however be altered according to the position which it is desired to give to the registering device in the interior of the carriage.

The rockshaft G, connects by means of an arm $g$, with the pawl $h$, which is intended to give motion to the ratchet wheel H, and a spiral spring $i$, serves to keep the pawl properly in gear with the teeth of the ratchet wheel. A catch $i$, dropping behind the teeth of the ratchet wheel prevents a motion of the latter in the wrong direction. A ratchet wheel H, is firmly secured to a vertical shaft I, which connects by a sleeve or socket J, with a square hole, to the arbor K, that serves to give motion to the wheels of the registering device. By these means the registering device is allowed to follow the motions of the carriage without interfering with the correct actions of the registering wheels and hands.

The registering device is inclosed in a case L, and it consists of two wheels $j$ and $k$; the wheel $j$, being firmly attached to the arbor $l$, which carries the large hand $m$, and the wheel $k$, being secured to a sleeve $n$, which turns freely on the arbor $l$, and which carries the small hand $o$. Motion is imparted to the wheel $j$, by means of an endless screw $p$, at the upper end of the arbor K, and a spring catch $q$, is attached to the side of the wheel $j$, in such a manner that for every revolution of the wheel $j$, the catch $q$, is actuated by a cam $r$, and caused to propel the wheel $k$, for one tooth. The wheels $j$, and $k$, are brought in such relation to the circumference of the carriage wheel that the large hand $m$, indicates rods, and the small hand $o$, miles, and the dial over which said hands move is marked with a suitable scale to enable the observer to tell at a glance the distance traveled over by the carriage.

The registering device is intended to be secured in some convenient place in the inside of the carriage, and in such a position that it is always in view and that the observation can be made by a person riding in the carriage, without leaving the seat, whereas, with carriage registers of the ordinary construction the registering apparatus is connected to the wheel, or to the axle, and if an observation is to be taken, the driver, or other person desiring to take such observation, has to get out of the carriage and stoop down in order to ascertain the position of the index.

What I claim as new, and desire to secure by Letters Patent, is—

The arrangement of the tubular sleeve J, in combination with the shaft I, carrying the ratchet wheel H, and with the shaft K, giving motion to the registering wheels substantially as and for the purpose specified.

L. W. NICHOLLS.

Witnesses:
M. M. LIVINGSTON,
B. GIROUSE.